United States Patent
Todorovic

(10) Patent No.: US 9,784,213 B2
(45) Date of Patent: Oct. 10, 2017

(54) AEROENGINE THRUST REVERSER ARRANGEMENT

(71) Applicant: ROLLS-ROYCE DEUTSCHLAND LTD & CO KG, Dahlewitz (DE)

(72) Inventor: Predrag Todorovic, Berlin (DE)

(73) Assignee: ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 444 days.

(21) Appl. No.: 14/060,044

(22) Filed: Oct. 22, 2013

(65) Prior Publication Data
US 2014/0116025 A1 May 1, 2014

(30) Foreign Application Priority Data
Oct. 29, 2012 (GB) .................... 1219368.6

(51) Int. Cl.
F02K 1/72 (2006.01)
F02K 1/80 (2006.01)
F02K 1/76 (2006.01)

(52) U.S. Cl.
CPC ............. F02K 1/72 (2013.01); F02K 1/76 (2013.01); F02K 1/805 (2013.01); F05D 2240/55 (2013.01); F05D 2250/283 (2013.01); F05D 2260/96 (2013.01); Y02T 50/672 (2013.01)

(58) Field of Classification Search
CPC ...... F02C 7/24; F05D 2260/962; F02K 1/566; F02K 1/60; F02K 1/605; F02K 1/62; F02K 1/625; F02K 1/70; F02K 1/72; F02K 1/805; F02K 1/827
See application file for complete search history.

(56) References Cited

U.S. PATENT DOCUMENTS

| | | | |
|---|---|---|---|
| 3,797,785 A | | 3/1974 | Baerresen et al. |
| 4,026,105 A | * | 5/1977 | James ............... F02K 1/70 239/265.29 |
| 5,003,770 A | * | 4/1991 | Schegerin .......... F02K 1/70 239/265.29 |
| 5,090,197 A | | 2/1992 | Dubois |
| 5,243,817 A | * | 9/1993 | Matthias ............ F02K 1/70 239/265.29 |
| 5,267,438 A | | 12/1993 | Bunel et al. |
| 5,575,147 A | | 11/1996 | Nikkanen |
| 5,765,362 A | | 6/1998 | Gonidec et al. |
| 5,806,302 A | * | 9/1998 | Cariola .............. F02K 1/09 239/265.29 |
| 5,927,647 A | * | 7/1999 | Masters ............. F02K 1/72 239/265.19 |

(Continued)

FOREIGN PATENT DOCUMENTS

GB 2 395 175 A 5/2004
WO WO 2008/132294 A1 11/2008

OTHER PUBLICATIONS

Search Report issued in British Application No. GB1219368.6 dated Jan. 17, 2013.

Primary Examiner — Andrew Nguyen
(74) Attorney, Agent, or Firm — Oliff PLC

(57) ABSTRACT

A blocker door for a gas turbine engine thrust reverser having a tray with a base and sidewalls extending about the base to define a volume, the volume being closed by a cover that extends beyond the periphery of the tray. The extension of the cover beyond the periphery provides a sealing feature.

25 Claims, 7 Drawing Sheets

(56) References Cited

U.S. PATENT DOCUMENTS

| | | | |
|---|---|---|---|
| 6,514,045 B1* | 2/2003 | Barton | F01D 5/22 416/193 A |
| 2004/0221580 A1* | 11/2004 | Mains | F23N 1/002 60/734 |
| 2007/0084964 A1 | 4/2007 | Sternberger | |
| 2009/0121078 A1* | 5/2009 | Marche | B64D 29/06 244/110 B |
| 2012/0023901 A1* | 2/2012 | Gilson | F02K 1/09 60/226.3 |
| 2012/0067024 A1* | 3/2012 | Vauchel | F02K 1/72 60/226.2 |

* cited by examiner

AEROENGINE THRUST REVERSER ARRANGEMENT

TECHNICAL FIELD OF INVENTION

The invention relates to thrust reverser arrangements for a gas turbine engine and in particular a cascade thrust reverser.

BACKGROUND OF INVENTION

Thrust reversers are provided on a gas turbine engine to selectively alter the direction of the fan flow from the engine. The thrust reversers are typically deployed on landing to decelerate an aircraft.

One type of thrust reverser is known as a cascade thrust reverser that has an array of cascade boxes downstream of a fan casing that are deployed by an axial rearward translation of a cowl that causes blocker doors to rotate from a stowed position to their deployed position and direct the engine air through the cascade.

Engine efficiency is driven partly by the amount of air loss that could otherwise be used to generate thrust and it is an object of the invention to seek to provide an improved thrust reverser arrangement that limits these losses when the thrust reverser is not deployed.

STATEMENTS OF INVENTION

According to a first aspect of the invention there is provided a blocker door for a gas turbine engine thrust reverser having a tray with a base and sidewalls extending about the base to define a volume, the volume being closed by a cover that extends beyond the periphery of the tray, wherein the extension of the cover beyond the periphery provides a sealing feature.

The tray may be rectangular, trapezoidal or combination with chamfered sides, in plan and is preferably formed of a metal or more preferably a composite, made up of a plurality of resin impregnated plies of carbon or glass fibres.

Preferably the tray further comprises a flange extending from the sidewalls to which the cover is joined, the cover extending beyond the periphery of the flange. The flange may extend outwardly or inwardly from the sidewalls. Preferably the flange is integral with the sidewalls.

The cover which faces the bypass duct is preferably a moulded rubber directly bonded or mechanically fastened to the flange or sidewalls. The rubber offers the advantage that it can have a flexibility that can be used to seal with another part of the engine when the blocker door is stowed or deployed.

The cover may be perforated for acoustic lining purpose. Preferably the volume contains an acoustic liner. Preferably the acoustic liner is a honeycomb.

Preferably the sealing feature is a flat ("lip") seal, or a P or omega seal.

According to a second aspect of the invention there is provided a thrust reverser unit for a gas turbine comprising a cowl having an inner surface and a blocker door according to any of the preceding seven paragraphs, wherein the sealing feature seals against the inner surface of the cowl when the blocker door is in a stowed position.

Preferably the inner surface has a land and a depression, the tray being located in the depression and the sealing feature sealing against the land.

The inner wall may have a plurality of depressions, each depression locating a respective tray. The inner wall may have a land between adjacent depressions.

Preferably the cowl is translatable from an axially forward stowed position to an axially rearward deployed position.

The thrust reverser may further comprising a linkage connecting the blocker door with the cowl, the linkage arranged such that translation of the cowl from the stowed position to the deployed position effects employment of the blocker door from a stowed position against the inner surface of the cowl to a deployed position across a gas turbine bypass duct.

In a deployed position the sealing feature of a first blocker door may abut a sealing feature of a second blocker door.

DESCRIPTION OF DRAWINGS

The invention will now be described, by way of example only, with reference to the accompanying drawings in which.

DETAILED DESCRIPTION OF INVENTION

Figure 1:
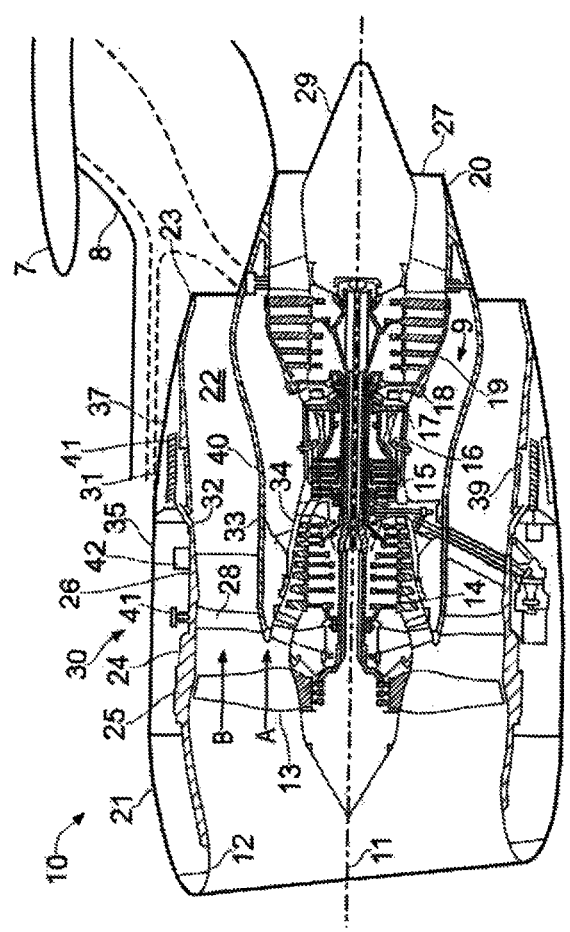
FIG. 1 depicts an exemplary ducted gas turbine having a thrust reverser cascade.

Referring to FIG. 1, a ducted fan gas turbine engine generally indicated at 10 has a principal and rotational axis 11. The engine 10 comprises a propulsive fan 13 and a core engine 9 having, in axial flow series, an air intake 12, an intermediate pressure compressor 14, a high-pressure compressor 15, combustion equipment 16, a high-pressure turbine, an intermediate-pressure turbine 18, a low-pressure turbine 19 and terminating with a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 11 is accelerated by the fan 13 to produce two air flows: a first airflow A into the intermediate pressure compressor 14 and a second airflow B which passes through a bypass duct 22 to provide propulsive thrust. The intermediate pressure compressor 14 compresses the airflow A directed into it before delivering that air to the high pressure compressor 15 where further compression takes place.

The compressed air exhausted from the high pressure compressor 15 is directed into the combustor 16 where it is mixed with fuel and combusted. The resultant hot combustion products then expand through, and thereby drive, the high, intermediate and low-pressure turbines 17, 18, 19 before being exhausted through the nozzles 20 to provide additional propulsive thrust. The high, intermediate and low pressure turbines 17, 18, 19 respectively drive the high, intermediate pressure compressors 15, 14 and the fan 13 by suitable interconnecting shafts.

A centre plug 29 is positioned within the core exhaust nozzle 20 to provide a form for the core gas flow A to expand against and to smooth its flow from the core engine. The centre plug 29 extends rearward of the cone nozzle's exit plane 27.

The fan is circumferentially surrounded by a structural member in the form of a fan casing 24 which is supported by an annular array of outlet guide vanes 28. The fan casing 24 comprises a rigid containment casing 25 and attached rearwardly thereto is a rear fan casing 26.

The gas turbine engine 10 is installed under an aircraft wing 7 via a pylon 8. The nacelle 21 comprises an axially forward cover 35 (fan cowl) and a translatable cowl 37. Both the cover and the cowl are provided by C-shaped openable doors with each door being separately hinged to the aircraft pylon 8. The nacelle has a thrust reverser unit 31 which is formed from a number of cascade panels arranged sequentially around the circumference of the engine 10. The hinged doors permit access to the engine core for maintenance or inspection purposes.

Figure 2:
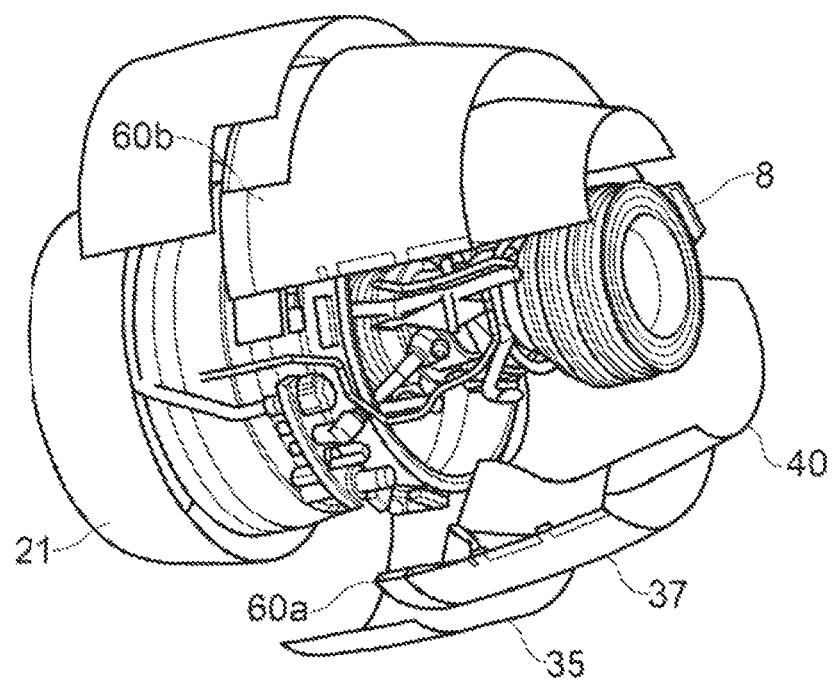
FIG. 2 shows a isometric (perspective) view of the ducted gas turbine with the cowl open for inspection or maintenance of the engine core.

FIG. 2 depicts the open nacelle 21 has hinges positioned at the top of the engine or on the pylon and which permits each part of the C duct defined by the cover 35, the translating cowl 37 and inner fixed structure 40 to rotate away from the engine to permit access thereto. Both the cowl and the cover 35 can pivot away from the engine. The thrust reverser unit 31 is mounted to the cover and can pivot away from the engine with the cover.

The cowl 37 is provided with an axially forward tongue 60 which is formed of two parts 60*a* and 60*b* extending from each of the two doors forming the translatable cowl. The cover 35 has a recess which engages the tongue when the cowl and cover are closed to provide a streamlined external surface for the nacelle.

Figure 3:
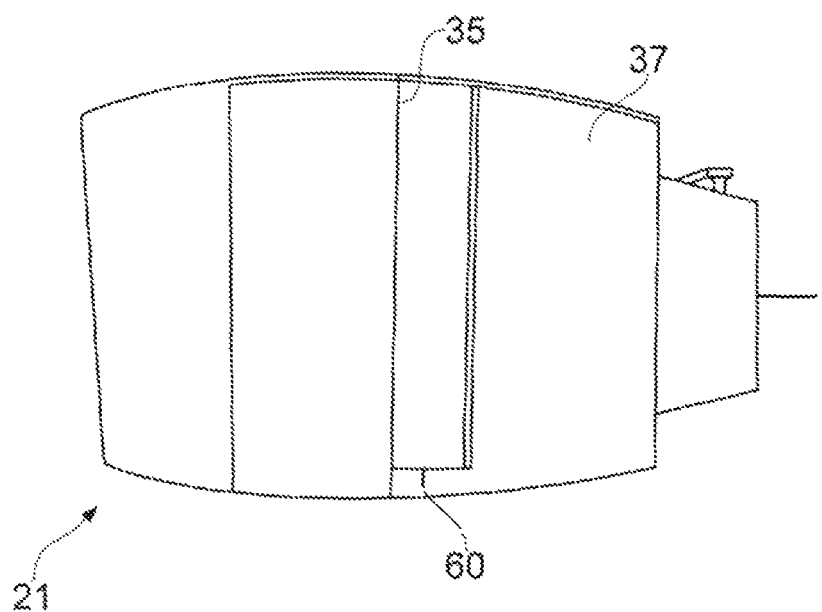
FIG. 3 depicts the nacelle with the cowl in its stowed position.
Figure 4:
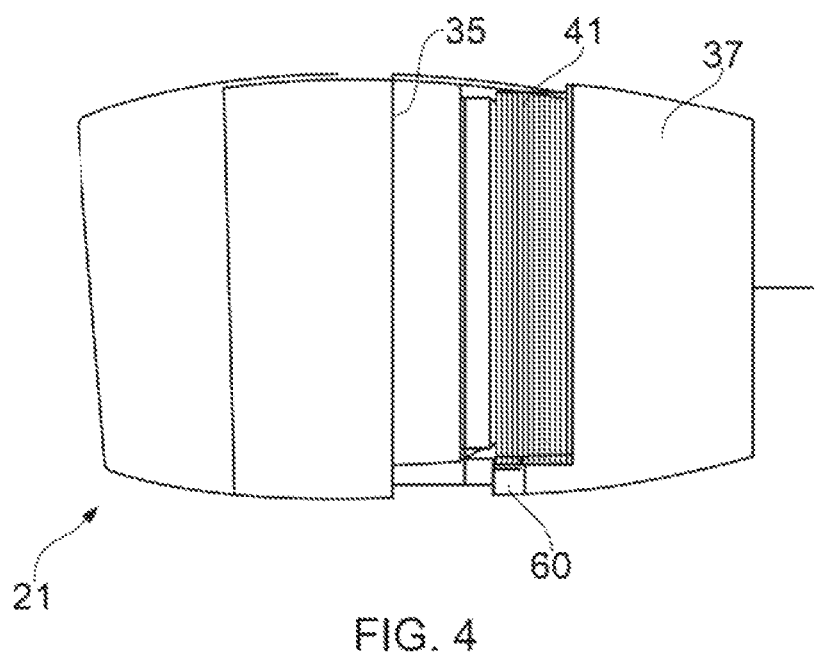
FIG. 4 depicts the nacelle with the cowl in its deployed position.

This is shown in FIG. 3 where the nacelle is closed in an in-flight position. The translatable cowl is in its stowed position such that the cowl abuts the axially forward cover. translatable thrust reverser unit is in an axial forward position in contrast to FIG. 4, where the unit has been deployed rearwardly to open the cascades 41. As shown in FIG. 4 the tongue 60 in the deployed position of the cowl is aligned with the axial position of the cascade. Advantageously, this negates the need for a blanking cascade panel to be provided in the cascade in order to inhibit the flow of thrust reverser air radially towards the ground. However, it is possible to provide an appropriate cascade panel with or without the use a cowl that does not have a tongue arrangement. Where a tongue is used it can be provided with a radially inner form that turns the air towards the front of the engine. In both these figures the tongue 60 is located 180 degrees from the pylon (not shown) and is located on the underside of the engine.

Figure 5:
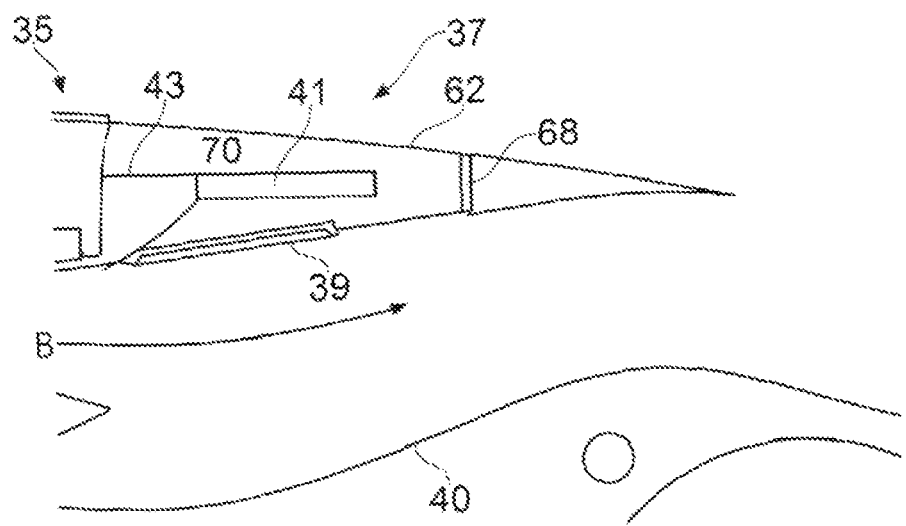
FIG. 5 is a partial cross-section through the centre of the blocker door showing the engine including the thrust reverser cascades with the cowl in the stowed position

FIG. 5 is a partial cross section through the cascade and cowl arrangement of FIG. 3. The cowl 37 has a bifurcated fairing that has a radially outer wall 62 that forms an airwashed surface for the external surface of the nacelle and a radially inner wall 64 that forms an airwashed surface for the bypass duct 22. A blocker door 39 is located against the radially inner surface of the radially inner wall 64 in the stowed position with the inner wall of the fairing providing additional support for the blocker door against the pressures of the flow through the bypass. The inner wall is stepped 66 to enable the blocker door to be recessed in the stowed position in order to provide a streamlined surface. A frame 68 joins the radially inner and outer walls (64,62).

Between the inner and outer walls there is a cavity 70 within which the cascade 41 is located. When the cowl is in the stowed position of FIGS. 3 and 5 the cascade is isolated from the main flow through the bypass duct by the blocker door 39 and the radially inner wall 64 of the fairing. In addition, any leakage flow through either of these parts is inhibited from leaving the engine by the radially outer wall 62 of the cowl which seals against the cover 35. Any parasitic air flows inside the cavity 70 reduces the performance of the powerplant and therefore it is imperative to reduce them to minimum.

The cascade 41 comprises an arrangement of vanes that are designed to turn a flow of air from the bypass duct when the cowl is translated to its open position towards the front of the engine to provide the reverse thrust relative to the normal direction of thrust generated by the engine. The cascade is assembled as a series of panels each of which provides a segment of the circumference of the thrust reverser.

Figure 6:
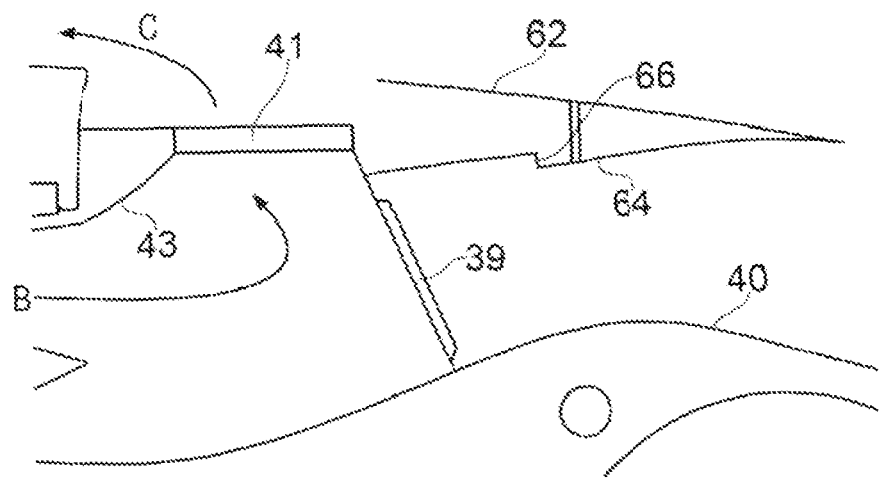
FIG. 6 is as partial cross-section through the centre of the blocker door showing the engine including the thrust reverser cascades with the cowl in the deployed position

In FIG. 6 the cowl 37 is shown in its deployed position which is axially rearward of the stowed position. The blocker doors 39 are connected to the trans cowl via hinges (for axial translation of the blocker doors) and by linkages to the inner fixed structure (for rotation of the blocker doors) to direct the bypass flow through the cascades where the flow is turned in a forward direction and through a passage opened in the outer wall of the nacelle by the axially rearward movement of the outer wall. The flow of air through the cascade is shown by the arrows B and C.

Figure 7:
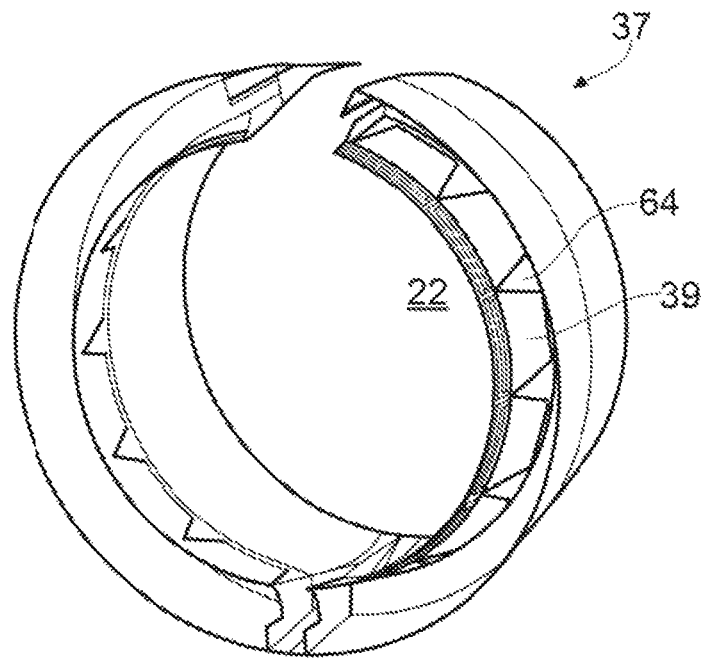
FIG. 7 is a perspective (isometric) view of blocker doors in their stowed position.

FIG. 7 is a perspective view of the blocker doors 39 arranged in their stowed position. Each door has a generally trapezoidal form which is mounted within a correspondingly shaped depression in the inner wall 64 of the translatable cowl. By locating the blocker doors in respective depressions it is possible to the blocker doors and inner wall to together provide a streamlined outer wall for the bypass duct 22.

Figure 8:
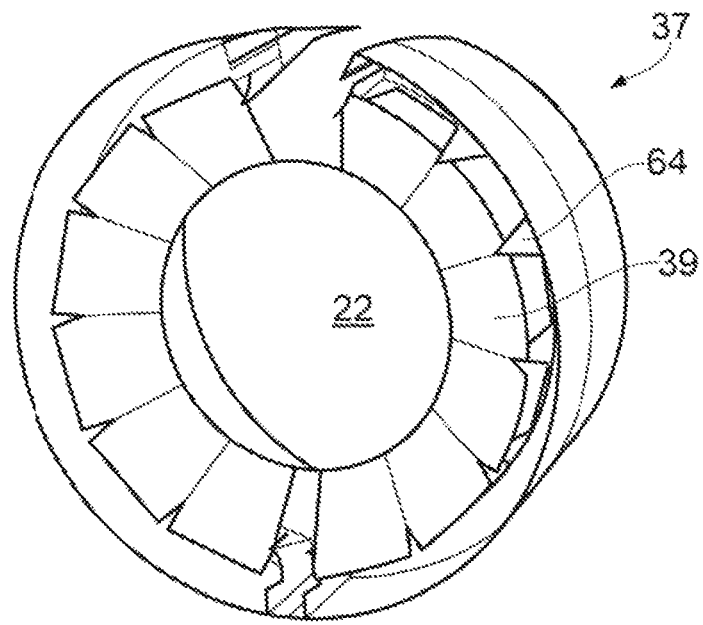
FIG. 8 is a perspective (isometric) view of the blocker doors in their deployed position.

In FIG. 8 the blocker doors are deployed following translation of the cowl. The axially rearward and narrower end of the door rotates inwards till the edges abut the edges of the adjacent and neighbouring doors to provide the barrier that deflects the air flow from the bypass duct through the thrust reverser cascade.

The leakage, parasitic flow in cavity 70, past the stowed blocker panels can reduce the overall efficiency of the engine and it is desirable to minimise this leakage. The blocker panels are formed as an assembly including a backskin 100, an internal support material 102 (honeycomb) and an airwashed facing sheet 104.

Figure 9:
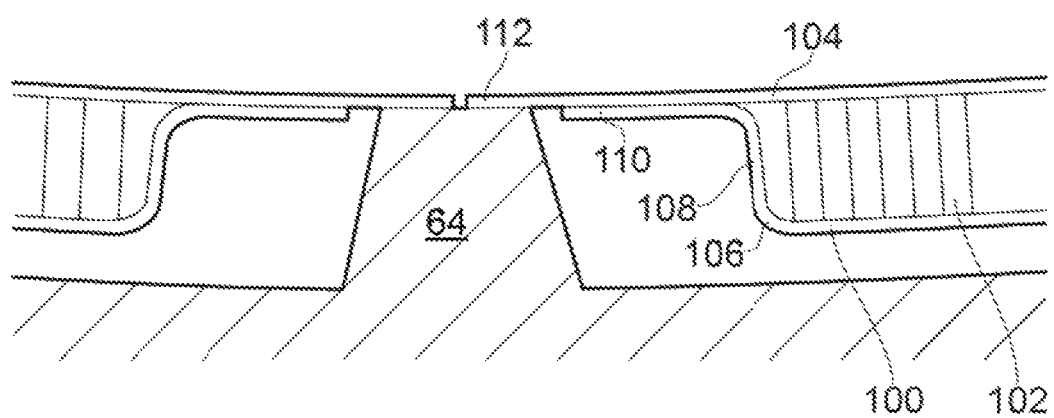
FIG. 9 is a partial cross sectional view (local ZX plane) of stowed blocker doors showing the circumferential arrangement.

As shown in FIG. 9, the backskin is moulded or otherwise formed into a tray having a base 106, side walls 108, and a flange 110 which protrudes from the side walls. The backskin is formed of metal or, more preferably, a composite material which may be formed of a laminate of individual plies of carbon or glass fibres held within a resin matrix. The flange extends around the periphery of the tray and provides a surface to which the facing sheet can be joined.

The tray is filled with the internal support material that provides rigidity to the blocker doors so that on deployment into the gas flow when reverse thrust is required the doors can withstand the high force of the flow. The support material is preferably in the form of a honeycomb, which, when combined with perforated facing sheet 104, contributes to a noise insulation lining as well as providing the required strength.

The tray is closed with a facing sheet 104, bonded or otherwise secured to the flange 110. The facing sheet has some flexibility and is preferably formed of a rubber or other elastomeric material that can be perforated to allow a small flow of air into and out of the tray that assists with the acoustic damping.

By making the facing sheet 104 from elastomeric material or rubber and making the rubber sheet protrude beyond the periphery of the flange to provide a "lip" seal portion 112 and in the stowed position seals against the inner wall 64 of the translatable cowl and against the cascade support structure 43 along its and beneficially all edges. The pressure of the air in the bypass duct forces the seal against a land on the inner wall of the cowl.

In the deployed position the flexible rubber sheet seals against the core engine fairing 40 at its radially inner edge, against abutting blocker doors along its side edges.

The seal is enhanced by the pressure in the bypass duct which presses the seal against the inner wall of the cowl in use to further limit the parasitic flow of air past the seal.

Figure 10:
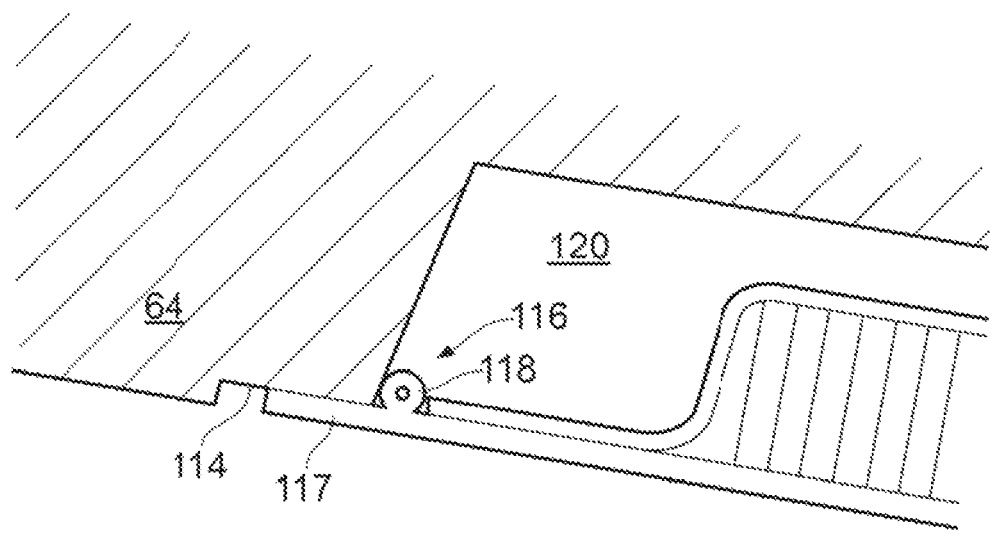
FIG. 10 is a view of a stowed blocker door with an alternative (integrated) seal.

Although the seals have been depicted and described here as flat ("flip") seals it will be appreciated that other forms of seals e.g. P or Omega seals that have a shaped end may also be used. FIG. 10 depicts an alternative arrangement, where the inner wall 64 has a step to provide a ledge 114 that supports the seal. The "omega" seal 116 has an elongate portion 117 and as bulbous portion 118 integrally moulded together. Advantageously, sealing is improved by providing two seal locations: the first against the ledge on the land, the second against the side of the depression 120 in the inner wall 64. The choice of material, material thickness and/or shape 112 & 118 and its programmed hardness for the facing sheet can also be selected to achieve the desired functionality for the seal. Additionally, because the cover is formed of a thermoplastic or thermosetting resin or rubber material it is possible to provide this as a moulded construction with graded material and/or functional properties. Advantageously, the periphery of the cover that seals against the outer wall of the bypass duct may therefore be formed to be more rigid or more flexible than the inner section of the cover which secures the cover to the tray.

If the facing sheet is formed of a fire resistant material the use of the blocker doors as a fire barrier is enhanced.

Access to the core engine and associated accessories is achieved by deploying the thrust reverser unit and/or rotating open the translating cowls. The core fairing 40, which is hinged independently, is then rotated open. Alternatively, individual panels may be provided and readily removed.

The invention claimed is:

1. A thrust reverser unit for a gas turbine comprising a cowl having an inner surface, and one or more blocker doors, each blocker door comprising:
    a tray with a base and sidewalls extending about the base to define a volume, the volume being closed by a cover that extends beyond the periphery of the tray, wherein an extension of the cover beyond the periphery of the tray provides a flexible sealing feature,
    wherein the tray further comprises a flange extending from the sidewalls to which the cover is joined, and wherein the flange extends around the periphery of the tray,
    wherein the flexible sealing feature seals against the inner surface of the cowl when the one or more blocker doors are in a stowed position,
    wherein the one or more blocker doors comprise a first blocker door and a second blocker door, and
    wherein in a deployed position the sealing feature of the first blocker door abuts the sealing feature of the second blocker door.

2. The thrust reverser unit according to claim 1, wherein the inner surface of the cowl has a land defining a first surface and a depression defining a second surface,
    wherein the tray is disposed in the depression of the cowl,
    wherein the flexible sealing feature comprises first and second portions, and
    wherein the first portion contacts and seals the first surface and the second portion contacts and seals the second surface.

3. The thrust reverser unit according to claim 2, the cover extending beyond the periphery of the flange.

4. The thrust reverser unit according to claim 2, wherein the cover comprises a moulded rubber.

5. The thrust reverser unit according to claim 3, wherein the cover comprises a moulded rubber.

6. The thrust reverser unit according to claim 4, wherein the cover is perforated.

7. The thrust reverser unit according to claim 4, wherein the tray contains an acoustic liner.

8. The thrust reverser unit according to claim 7, wherein the acoustic liner comprises a honeycomb.

9. The thrust reverser unit according to claim 2, wherein the flexible sealing feature comprises a flat seal, or a "P" seal.

10. The thrust reverser unit according to claim 1, wherein the inner surface has a land and a depression, the tray being located in the depression and the flexible sealing feature sealing against the land.

11. The thrust reverser unit according to claim 1, wherein the inner surface has a plurality of depressions, each depression of the plurality of depressions locating a respective tray.

12. The thrust reverser unit according to claim 1, wherein the inner surface has a land between depressions.

13. The thrust reverser unit according to claim 1, wherein the cowl is translatable from an axially forward stowed position to an axially rearward deployed position.

14. The thrust reverser unit according to claim 1, further comprising a linkage connecting one of the blocker doors with the cowl, the linkage configured to translate the cowl from the stowed position to the deployed position to effect employment of the one of the blocker doors from a stowed position against the inner surface of the cowl to a deployed position across a gas turbine bypass duct.

15. The thrust reverser unit according to claim 1,
    wherein the cover extends beyond the periphery of the flange.

16. The thrust reverser unit according to claim 1, wherein the cover comprises a moulded rubber.

17. The thrust reverser unit according to claim 16, wherein the moulded rubber cover has at least one integrally formed "P" seal.

18. The thrust reverser unit according to claim 1, wherein the cover comprises a facing sheet, wherein the flange provides a surface to which the facing sheet can be joined, and wherein the facing sheet is bonded or secured to the flange.

19. A thrust reverser unit for a gas turbine comprising:
    a cowl having an inner surface and one or more blocker doors, the one or more blocker doors comprising:

a tray with a base and sidewalls extending about the base to define a volume;

a cover that extends beyond the periphery of the tray and closes the volume, wherein an extension of the cover beyond the periphery of the tray provides a flexible sealing feature;

wherein the flexible sealing feature seals against the inner surface of the cowl when the one or more blocker doors are in a stowed position, wherein the one or more blocker doors comprise a first blocker door and a second blocker door, and wherein in a deployed position the sealing feature of the first blocker door abuts the sealing feature of the second blocker door.

20. The thrust reverser unit according to claim 19, wherein the inner surface of the cowl has a land defining a first surface and a depression defining a second surface, wherein the tray further comprises a flange extending from the sidewalls to which the cover is joined, and wherein the flange extends around the periphery of the tray, wherein the tray is disposed in the depression of the cowl, wherein the flexible sealing feature comprises first and second portions, and wherein the first portion contacts and seals the first surface and the second portion contacts and seals the second surface.

21. The thrust reverser unit according to claim 19, wherein the inner surface of the cowl has a land defining by a first surface and a depression defining a second surface, the one or more blocker doors further comprising a flange extending from the sidewalls, wherein the flange extends around the periphery of the tray, wherein the cover is joined to the flange, wherein the volume is closed by the cover that is joined to the flange, wherein the cover extends beyond the periphery of the flange, wherein the tray is disposed in the depression of the cowl, wherein the flexible sealing feature comprises first and second portions, and wherein the first portion contacts and seals the first surface and the second portion contacts and seals the second surface.

22. The thrust reverser unit according to claim 2, wherein the flexible sealing feature comprises an omega-shaped seal, wherein the first portion of the sealing feature is an elongate portion and the second portion of the sealing feature is a bulbous portion.

23. The thrust reverser unit according to claim 1, wherein the flexible sealing feature comprises an omega-shaped seal, wherein a first portion of the sealing feature is an elongate portion and a second portion of the sealing feature is a bulbous portion.

24. The thrust reverser unit according to claim 19, wherein the flexible sealing feature comprises an omega-shaped seal, wherein a first portion of the sealing feature is an elongate portion and a second portion of the sealing feature is a bulbous portion.

25. The thrust reverser unit according to claim 15, wherein the flexible sealing feature comprises an omega-shaped seal, wherein a first portion of the sealing feature is an elongate portion and a second portion of the sealing feature is a bulbous portion.

* * * * *